Patented Apr. 26, 1932

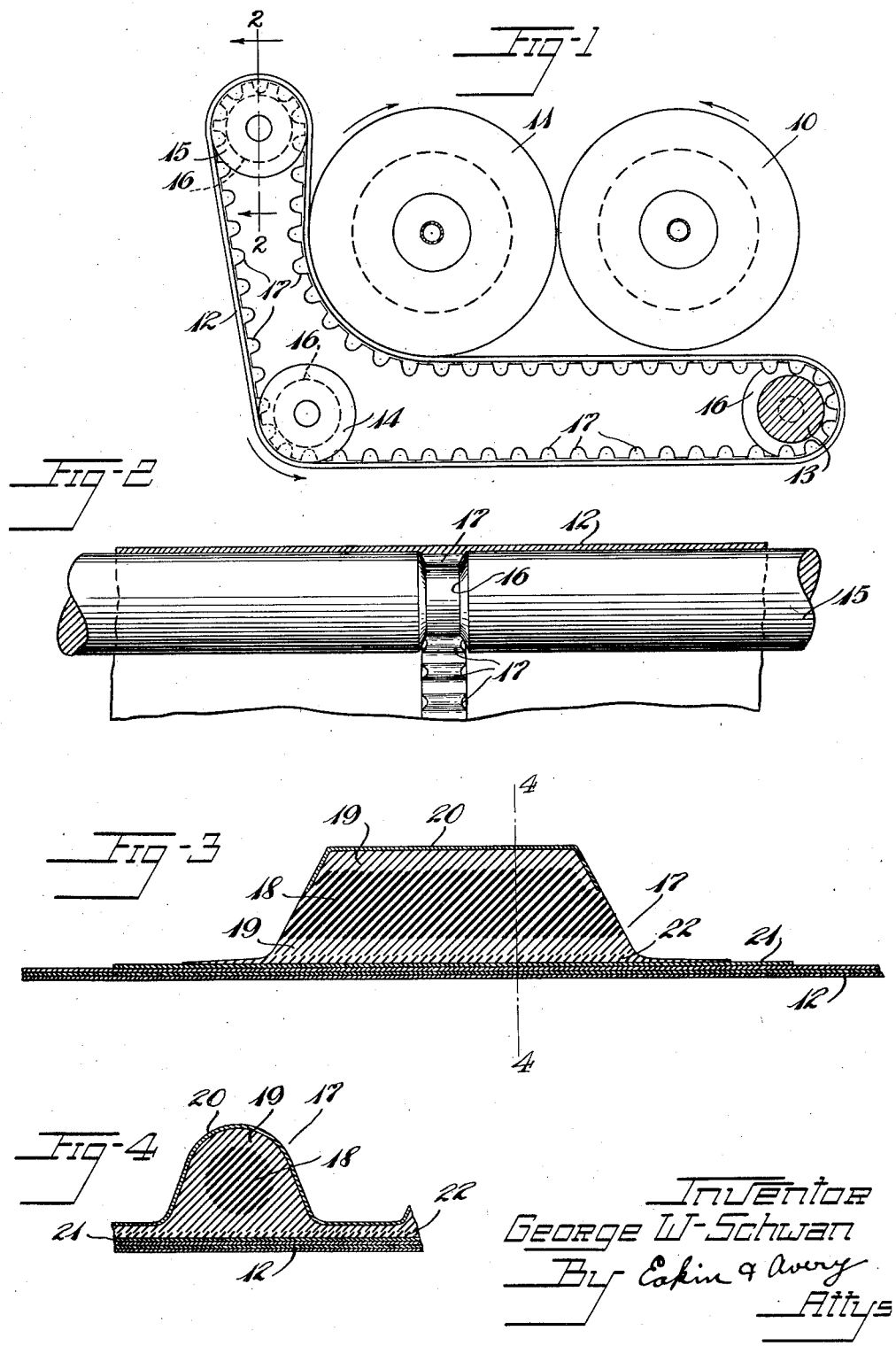

1,855,808

UNITED STATES PATENT OFFICE

GEORGE W. SCHWAN, OF AKRON, OHIO, ASSIGNOR TO THE B. F. GOODRICH COMPANY, OF NEW YORK, N. Y., A CORPORATION OF NEW YORK

CONVEYER BELT

Application filed April 20, 1929. Serial No. 356,702.

This invention relates to conveyer belts, and more especially to endless conveyer belts commonly known as mill aprons which are used in conjunction with mixing mills for plastics, for receiving uncombined or non-adhering masses of material at the delivery side of the mill rolls and returning the same to the receiving side of said rolls.

Mill aprons of the character mentioned preferably are provided on the reverse face of the apron with a row of lugs which engage a complementally shaped groove in the pulleys or sheaves which support the apron and thereby prevent lateral shifting of the apron, the lugs being spaced apart longitudinally of the apron to permit the same to pass around pulleys of small diameter. Heretofore the centering lugs on the apron have been provided with respective cylindrical reinforcements or fillers of wood, the wood being enclosed in rubber and fabric, which is vulcanized to the body of the fabric and rubber apron. This construction is not entirely satisfactory since perfect adhesion of wood and rubber is difficult to obtain, and the wood filler-blocks frequently work loose, fail to align with the grooves and damage or penetrate the enclosing fabric and the body of the apron.

The chief objects of the invention are to provide a mill apron having centering lugs of improved construction; to obtain improved adhesion of the constituent parts of the lugs; and in general, to prolong the useful life of the apron.

Of the accompanying drawings:

Fig. 1 is a diagrammatic side elevation of a mixing mill, and a conveyer belt embodying my invention in its preferred form operatively associated therewith.

Fig. 2 is a section on line 2—2 of Fig. 1 on a larger scale.

Fig. 3 is a longitudinal section through a centering lug and adjacent belt structure, on a larger scale.

Fig. 4 is a section on line 4—4 of Fig. 3.

Referring to Fig. 1 of the drawings, 10, 11 are the rolls of a mixing mill of well-known construction, and 12 is an endless conveyer belt or mill apron associated therewith, said apron being mounted upon sheaves or idler pulleys 13, 14, and 15, of which the latter is mounted for movement toward or away from the roll 11 to position the apron in inoperative or operative relation thereto. In the latter position, as shown in Fig. 1, the apron is driven by frictional engagement with the roll 11.

As shown in Fig. 2 with relation to the pulley 15, each of the pulleys 13, 14 and 15 is formed with a circumferential groove 16, preferably centrally disposed, and the apron 12 is provided with a longitudinal series of spaced-apart, transversely elongate lugs 17, 17 adapted to seat in the groove 16 of the supporting pulleys as the apron passes thereover, to center the apron and prevent lateral shifting thereof with relation to the pulleys and the mill rolls.

As shown in Figs. 3 and 4, each lug 17 comprises a generally cylindrical filler or core 18 of relatively stiff and preferably fibrous rubber composition, a relatively thin layer of resilient rubber 19 surrounding the same, and an overlying ply of heavy duck or fabric 20. The assembly is united with an underlying, somewhat wider, strip of duck or fabric 21 by means of an intermediate layer of resilient rubber or tie-gum 22, and the strip 21 is attached to the pulley-engaging face of the apron 12. The assembled apron is vulcanized together to provide a unitary structure. The fabric strips 20, 21 are continuous and are common to all the lugs, and the strip 20 is of such width as partly to overlie the end faces of the lugs, as is clearly shown in Fig. 3.

The component parts of the lugs 17 consisting mainly of rubber will flex slightly under severe strain, and said parts are firmly united by vulcanization and will not separate easily under severe operating conditions.

The invention may be modified within the scope of the appended claims.

I claim:

1. A conveyer belt having a series of belt-centering lugs mounted thereon, each lug of which comprises a core structure of relatively stiff rubber composition, a layer of resilient rubber enclosing the same, and a protective cover of fabric.

2. A conveyer belt having a series of belt-centering lugs mounted thereon, each lug of which comprises a body of relatively stiff rubber composition and a cushion layer of resilient rubber located between the stiff rubber composition and the supporting belt.

In witness whereof I have hereunto set my hand this 18th day of April, 1929.

GEORGE W. SCHWAN.